Sept. 13, 1966   B. J. HENDERSON   3,272,933
ROTARY INDEXING PROGRAMMER SWITCH USING CIRCUIT BOARDS
Filed July 10, 1964
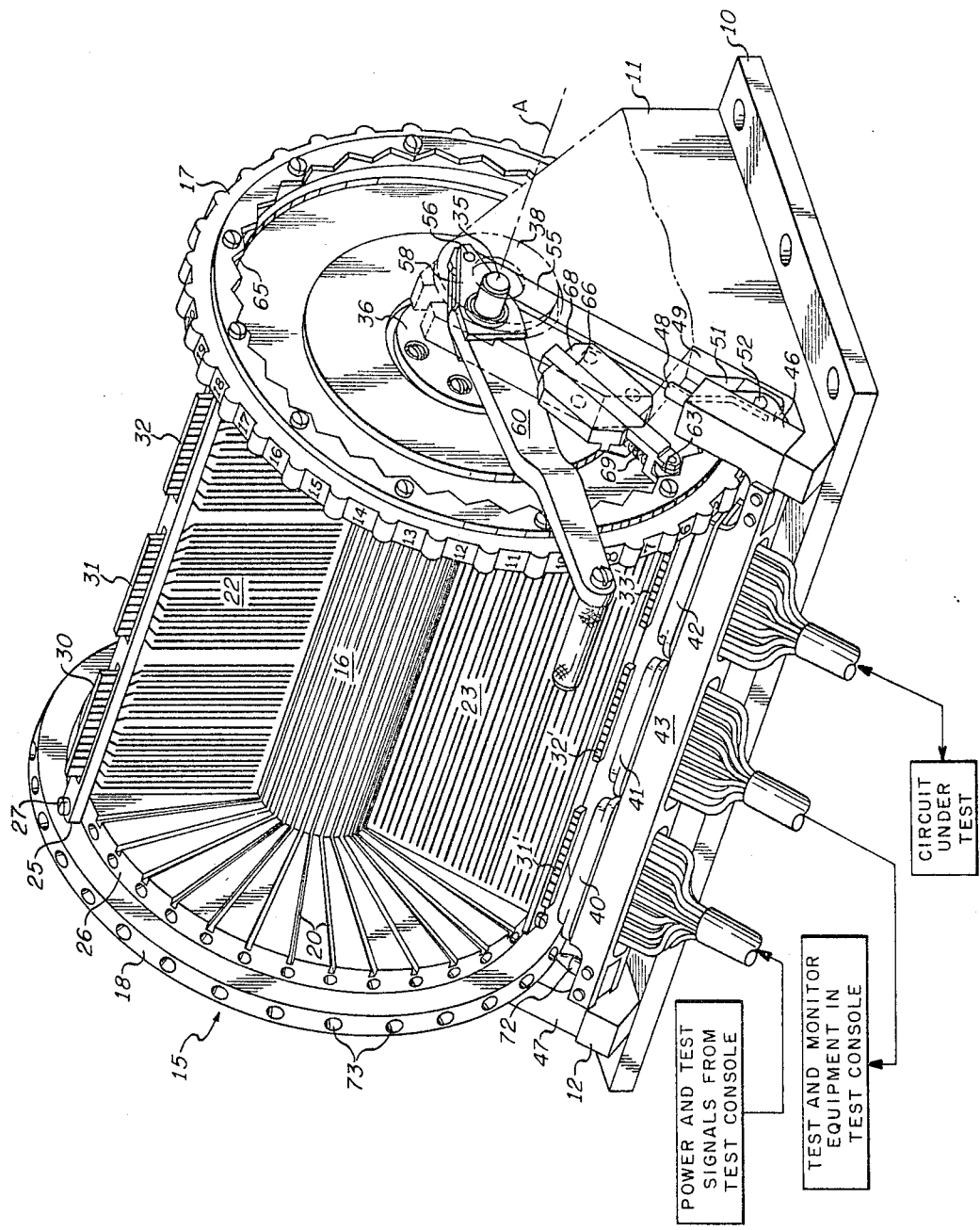
INVENTOR.
BILLY J. HENDERSON
BY
John H. Gallagher
ATTORNEY

United States Patent Office 3,272,933
Patented Sept. 13, 1966

3,272,933
ROTARY INDEXING PROGRAMMER SWITCH USING CIRCUIT BOARDS
Billy J. Henderson, Clearwater, Fla., assignor to Sperry Rand Corporation, Great Neck, N.Y., a corporation of Delaware
Filed July 10, 1964, Ser. No. 381,847
3 Claims. (Cl. 200—46)

This invention relates to a programmer switch for electrical circuits and more particularly relates to a programmer switch in which any one of a great plurality of preconstructed electrical circuits and/or electrical interconnecting networks may be rapidly selected and switched into an electrical or electronic system.

The present invention is particularly useful in electronic test equipment that is employed to check and troubleshoot large and complex electronic systems. For example, in the troubleshooting of a complex electronic system, many different individual circuits and sub-component parts of the system must be checked individually, and these different circuits require different power sources, different test signals, and different testing and monitoring equipment. To individually set up the testing circuitry and equipment for each circuit as it is tested is laborious and time consuming and is prohibitive in terms of time and cost in very complex electronic systems.

A common method of constructing complex electronic systems is to build individual circuits or a group of circuits in the form of modules which may be inserted and replaced as units in the overall system. Usually, each module is provided with one or more terminal plugs through which all input and output connections are made to the circuit or circuits of the module. The programmer switch of this invention is particularly useful in testing a complex electronic system constructed in this manner. With the use of the programmer switch of this invention, all the power sources and test signal sources required to test the various individual circuits and sub-component parts of an electronic system may be permanently mounted in a rack or console arrangement, and similarly, all the test apparatus such as voltage and current meters, frequency meters, oscilloscopes, and spectrum analyzers, for example, may be permanently mounted in racks or a console. The programmer switch of this invention provides a neat and compact arrangement of a plurality of preconstructed circuit boards, each one providing the necessary circuitry and/or interconnections to couple the necessary power supplies and test signal sources to a respective one of the individual circuits to be tested. Each circuit board further supplies the proper circuitry to interconnect the respective circuit being tested to the appropriate test equipment in the racks. Each of the programmer circuit boards is readily selectable and insertable into the testing or checking set-up, thus minimizing the time and effort of performing the tests, and considerably lessening the possibility of errors arising from incorrect circuit connections.

It therefore is an object of this invention to provide simple and compact programming and switching means for quickly and accurately connecting any one of a plurality of electrical circuits to be tested to the necessary sources of energization and test signals, and to the necessary testing and monitoring equipment.

Another object of this invention is to provide switching and indexing means for connecting any one of a plurality of pre-constructed electrical circuits and/or interconnecting networks in an electrical system.

A further object of this invention is to provide simple and rapid switching and programming means for selecting any one of a plurality of exclusive interconnections between various electrical circuits of an electronic system.

A still further object of this invention is to provide means for compactly packaging a plurality of electrical circuit boards having desired circuits and/or interconnection networks thereon and for rapidly and accurately selecting and connecting individual ones of the circuit boards into an electrical system.

In accordance with the illustrated embodiment of this invention, a plurality of planar circuit boards having electrical interconnecting networks and/or circuits thereon are supported radially, in angular spaced-apart relationship about the axle of a reel-shaped member. Each circuit board has electrical circuit connecting means along its outer edge which are adapted to mate with a connecting terminal plug, thereby providing means for making electrical connections to and from the circuitry on the circuit board. The reel is rotatably supported on a frame so that any one of the plurality of planar circuit boards may be rotated to a given angular position. At a fixed angular position with respect to the reel, appropriate circuit connector plugs are positioned and are attached to the frame in a manner to be moved radially into and out of contact with the circuit connecting means on the outer edges of the circuit boards supported on the rotatable reel. The circuit connector plugs at the fixed angular position provide circuit connections to power supplies, test signal circuits, other component circuits and testing apparatus, and to a circuit to be tested, all of which are interconnected in a predetermined manner by circuitry on an assigned one of the planar circuit boards mounted on the reel. Means are provided for disengaging the connector plugs from the circuit boards so that the reel is free to rotate to permit the selection of a different circuit board, when desired. Means also are provided for indexing the reel to assure accurate alignment and positive mating of the connector plugs with the edges of the circuit board.

The invention will be described by referring to the accompanying drawing which is a perspective view of the programmer switch of this invention, with a portion thereof illustrated in phantom, and with some of the planar circuit boards removed in order to more clearly illustrate and describe the device and its operation.

The programmer switch is supported by a rigid structure comprised of a base plate 10 and upright end supports 11 and 12. A card-supporting reel 15 is comprised of an axle 16 having longitudinally-extending slots thereon. Circular end members 17 and 18 are secured to axle 16 and each is provided with radially-extending slots 20 which register with respective longitudinally-extending slots on axle member 16.

Disposed within corresponding ones of the slots in axle 16 and circular end members 17 and 18 are planar circuit boards, such as the illustrated boards 22 and 23, it being understood that all of the slots may be filled with respective planar circuit boards, only two of which are shown in the illustration in order to expose more of the details of the device. As illustrated with respect to circuit board 22, a slotted bar 25 extends over the outwardly protruding portions of board 22 and holds the board in a fixed position, the bar 25 being secured to the inner rim 26 of end member 18 by means of a screw 27.

The planar circuit boards, all of which are identical prior to being programmed, are comprised of an insulating material, and as illustrated in the drawing, the front surface of each board, see board 22 for example, is comprised of a plurality of vertically extending conductive strips which may be of the printed circuit type, and whose outer terminal ends 30, 31 and 32 are arranged in groups of connectors so as to be adapted to mate with suitable connector plugs. The back surface of each one of the circuit boards, see board 23 for example, is comprised of a plurality of horizontally extending conductive strips, each of which is insulatingly separated from the other. Any one of the vertical conductors of a circuit board may be connected to any other one or more vertical conductors of that same circuit board by making appropriate conductive connections through the circuit board to a horizontally extending conductor on the back surface of the board. Conductive connections are made through the dielectric substrate of a circuit board by punching holes at desired locations where the conductors overlap and then installing an eyelet or plating the holes with a conductive material to form an eyelet. Furthermore, active and/or passive circuit elements may be mounted on the circuit boards with appropriate electrical connections being made to desired ones of the eyelets, which may be provided for this purpose, thereby providing circuit connections with desired vertical and/or horizontal conductors on the two faces of a circuit board. The recently developed subminiature and microminiature circuit elements are well suited for this application.

The reel 15 is supported between the upright end supports 11 and 12 by means of an axially extending spindle 35 which passes through a bearing 36 at the hub of end member 17. A second bearing 38 supports spindle 35 on upright end support 11. Similar arrangements of bearings support the spindle 35 and end member 18 on upright end support 12 on the left side of the device, these details being hidden by the end member 18.

Connections from external circuits may be made to the circuits and interconnecting networks formed on the circuit boards in reel 15 by means of connector plugs 40, 41, and 42 which are mounted in a connector bar 43 that is fixed at an angular position relative to reel 15, but which is free to move radially inwardly and outwardly so as to make and break electrical connections with the outer terminal ends 31′, 32′ and 33′ of circuit board 23, for example. Connector bar 43 is secured to each end to the respective bearing blocks 46 and 47 which are slidable along fixed rods, such as the rod 48 that extends across the gap 49 in upright end support 11. The underside of bearing block 46 is provided with a forked portion 51 through which passes the pin 52 which pivotally engages the end of a connecting rod 55. The opposite end of connecting rod 55 is attached to a pivot joint formed by a pin 56 that extends between the tines of a forked member 58 that is fixedly secured to the end of an actuating lever 60. Spindle 35 is secured to actuating lever 60 so that the spindle 35 will rotate as the actuating lever 60 is raised or lowered. The bearing block 47 on the left end of connector bar 43 is connected to spindle 35 by the same type of mechanism just described, the only difference being that there is no additional actuating lever on the left side of the device.

Thus, by means of the mechanism just described, connector bar 43, and thus connector plugs 40, 41 and 42 may be moved inwardly or outwardly with respect to reel 15 by raising or lowering the actuating lever 60. As illustrated in the drawing, connector bar 43 is in its outermost position in which connector plugs 40, 41, and 42 are disengaged from the outer terminal ends 31′, 32′ and 33′ of circuit board 23. To achieve engagement of the respective terminal plugs and terminal ends of the circuit board, actuating lever 60 is pushed down, that is, it rotates in a counterclockwise direction with respect to axis A that passes through spindle 35. This movement raises the fork member 58 and the upper end of connecting rod 55, thus pulling the bearing block 46 upwardly along rod 48 and against the upper edge of slot 49, thereby bringing the connector plugs 40, 41 and 42 into engagement with the outer terminal ends 31′, 32′ and 33′ of circuit board 23. The rotary motion transmitted through spindle 35 causes bearing block 47 to move in unison with bearing block 46.

Indexing means are provided to assure the correct alignment and engagement between the connector plugs and the outer terminal ends of the circuit board. This is provided by means of a roller detent 63 which is spring loaded into engagement with the serrated inner rim 65 of end member 17. Roller detent 63 is rotatably secured at the end of a rod 66 which is free to pass within a keyway in a block 68 that is fixedly secured to the inner surface of upright end support 11. Spring 69 provides the proper amount of spring force to cause roller detent 63 to hold end member 17 against free rotation, but yet allows the spring detent 63 to ride over the peaks of the serrated surface 65 when circular end member 17 is rotated by an operator applying a force to the periphery of the end member 17.

A further indexing means is provided by the tapered pin 72 that is positioned adjacent the left end of connector bar 43. Tapered pin 72 is adapted to engage the indexing holes 73 that are located about the outer rim of end member 18. The length of tapered pin 72 is chosen so that the pin engages an indexing hole just prior to the engagement of the terminal connector plugs 40, 41, and 42 with the outer terminal ends 31′, 32′, and 33′ of circuit board 23, thereby assuring an accurate alignment of the electrical connectors before contact is made. This precautionary measure prevents damage to the connector plugs and terminal ends of the circuit boards, and also prevents rotation of the reel 15 while the desired electrical connection is established. This further prevents damage to the circuit boards.

If desired, a suitable interlock switch may be associated with the actuating mechanism that moves connector bar 43, or with the mechanism of roller detent 63. This interlock switch arrangement would deenergize all input leads to connector plugs 40, 41, and 42 during the time that electrical contacts are being made and broken between the connector plugs and the outer terminal ends of the circuit boards. This will prevent damage to the respective connecting terminals due to electrical arcing, and thus will assure longer life for the respective components.

As may be seen from the drawing and from the above discussion, when connector bar 43 is withdrawn to its outermost position, reel 15 has the capability of complete freedom of rotation through any angle. This is possible because when the connector plugs 40, 41 and 42 are disengaged from the circuit board 23, there are no electrical connections to the circuit boards which would otherwise restrict the angular rotation of the reel 15.

As illustrated in the drawing, connector plug 40 provides terminal connectors for a plurality of conductors that may be connected to various power sources and test signal sources of a large and complex test console. Similarly, connector plug 41 may provide terminal connections for a plurality of conductors that lead to a variety of different types of test and monitoring equipment that also is located at the test console. This test equipment may include voltage and current meters, frequency meters, oscilloscopes, counters, and spectrum analyzers, for example. The connector plug 42, on the other hand, may provide terminal connections for a plurality of wires that lead to and from a module which contains one or more circuits that are to be tested. With such an arrangement as illustrated, each one of the circuit boards mounted on the reel 15 would be pre-wired, or pre-programmed so as to effect desired interconnections between the power sources, the circuit under test, and the test and monitoring equipment, these interconnections being accomplished between the vertical and horizontal conductors on the two faces of the circuit board, as explained above. Different tests may be performed on a circuit by providing different interconnections on various ones of the circuit boards and by sequentially connecting different ones of the circuit boards to the connector plugs 40, 41 and 42. Furthermore, the different circuit boards mounted on reel 15 may be programmed to provide the necessary interconnections for a number of different circuits to be tested. In one programming switch constructed in the manner illustrated in the drawing, 72 circuit boards were mounted within drum 15, and the boards provided the necessary interconnections and active and/or passive additional elements necessary to test a major portion of a complex electronic system which was built up of individual modules, each circuit board being cataloged to a corresponding module.

Additional circuit boards may be stored in an appropriate depository so that a rather voluminous library of circuit boards may be accumulated. In this way a programmer switch of this invention can make a rather complete testing console adaptable for testing the circuits and modules of a number of different complex electronic systems since it is a relatively easy matter to remove the mounted circuit boards from the reel and replace them with other circuit boards.

It should be understood that other types of connections may be made to the connector plugs 40, 41, and 42 and different types of circuit boards may be mounted in the reel 15. For example, the circuit boards may be wired to provide different programs for a computer, or may provide different types of active or passive circuits for computers or other electronic systems.

If desired, the entire device illustrated in the drawing may be mounted within a test console with only the actuating lever 60 and the periphery of circular end member 17 extending through a panel of the console. In this manner the operator can engage and disengage the connector plugs and can rotate reel 15 to any desired indexing position. The indexing positions are printed on the rim of end member 17 and would be visible to the operator.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A rotary switching means for providing electrical connection to any one of a plurality of pre-constructed electrical circuits comprising,
    a reel comprised of an axle and a radially extending end member at each end,
    a plurality of planar circuit boards disposed in angular spaced apart relationship about the axle of the reel and between said end members,
    electrical connection means positioned along the outermost edge of each circuit board and making electrical connection to circuit means on the respective circuit board,
    a spindle extending axially through said axle and rotatably secured to said reel,
    first and second spaced-apart end support members rotatably supporting the two ends of said spindle,
    at least one connector plug positioned at a fixed angular location at the periphery of said circuit boards on said reel,
    first and second spaced-apart slidable bearings and rigid axially-extending connector plug supporting means secured between said two slidable bearings, means permitting said bearings to slide radially inwardly and outwardly to permit said connector plug to engage and disengage the electrical connector means on the outermost edge of a circuit board,
    an actuating lever secured at a region intermediate its two ends to one end region of said spindle,
    said lever having a pivot joint at one end,
    means secured to the opposite end region of said spindle providing a second pivot joint,
    first and second rigid linking means each pivotally linked at one end to a respective one of said pivot joints and each connected at its other end to a respective one of said bearings,
        whereby rotation of said lever and spindle moves said connector plug radially inwardly or outwardly, and
    indexing means releasably holding said reel in any of a plurality of angular positions to provide accurate alignment of said connector plug with the electrical connector means of a circuit board located at said angular position.

2. Apparatus for compactly storing and rapidly and accurately selecting any one of a plurality of pre-constructed electrical circuit boards comprising,
    a reel rotatable about its central axis,
    a plurality of planar members each supporting electrical circuit means thereon,
        said planar members being supported by said reel and being disposed radially in spaced angular relationship about and axis,
    electrical terminal means disposed along the outermost edge of each of said planar members and providing circuit connections to the electrical circuit means on the respective planar members,
    at least one electrical connector plug disposed at a fixed angular position beyond the outermost edge of said planar members and aligned for insertion into contact with the terminal means on a planar member positioned at said fixed angular position,
    means imparting a linear radial motion to said connector plug to move said plug inwardly and outwardly to insert and withdraw it into and from engagement with the terminal means of a radially aligned planar member.

3. The combination claimed in claim 2 wherein the means imparting a linear radial motion to said connector plug includes,
    connector plug supporting means rigidly supporting the connector plug,
    slidable bearing means secured to said connector plug supporting means,
        said bearing means being slidable in a linear radial direction relative to said axis, and
    actuating means imparting linear radial motion to said bearing means and thus to said connector plug.

References Cited by the Examiner

UNITED STATES PATENTS

| | | | |
|---|---|---|---|
| 3,090,844 | 5/1963 | Streu | 200—46 |
| 3,159,724 | 12/1964 | Parstorfer | 200—33 |

BERNARD A. GILHEANY, *Primary Examiner.*

T. D. MACBLAIN, *Assistant Examiner.*